US008526294B2

(12) United States Patent
Goulahsen

(10) Patent No.: US 8,526,294 B2
(45) Date of Patent: Sep. 3, 2013

(54) DATA EXCHANGE DEVICE USING ORTHOGONAL VECTORS

(75) Inventor: Abdelaziz Goulahsen, Coublevie (FR)

(73) Assignee: ST-Ericsson SA, Plan-les-Ouates (CH)

( * ) Notice: Subject to any disclaimer, the term of this patent is extended or adjusted under 35 U.S.C. 154(b) by 208 days.

(21) Appl. No.: 12/955,807

(22) Filed: Nov. 29, 2010

(65) Prior Publication Data

US 2011/0292784 A1 Dec. 1, 2011

(30) Foreign Application Priority Data

Nov. 30, 2009 (FR) ...................................... 09 58498

(51) Int. Cl.
*H04J 11/00* (2006.01)

(52) U.S. Cl.
USPC ............................ 370/203; 370/208; 370/281

(58) Field of Classification Search
USPC ................ 370/203, 204, 205, 206, 207, 208, 370/209, 210, 211, 466, 467, 281
See application file for complete search history.

(56) References Cited

U.S. PATENT DOCUMENTS

| | | | | |
|---|---|---|---|---|
| 7,263,084 | B2* | 8/2007 | Miyoshi ........................ | 370/335 |
| 8,064,528 | B2* | 11/2011 | Giannakis et al. ............. | 375/260 |
| 2003/0185174 | A1* | 10/2003 | Currivan et al. .............. | 370/335 |
| 2007/0025421 | A1* | 2/2007 | Shattil ........................... | 375/136 |
| 2008/0232387 | A1 | 9/2008 | Rijpkema et al. | |
| 2009/0129443 | A1* | 5/2009 | Suzuki .......................... | 375/133 |
| 2011/0235501 | A1 | 9/2011 | Goulahsen | |
| 2012/0014392 | A1* | 1/2012 | Bhushan et al. .............. | 370/441 |

FOREIGN PATENT DOCUMENTS

| | | |
|---|---|---|
| FR | 2 936 384 A1 | 3/2010 |
| WO | 2010/031824 A1 | 3/2010 |

OTHER PUBLICATIONS

Wang, X., et al., "Applying CDMA Technique to Network-on-Chip," IEEE Transactions on Very Large Scale Integration (VLSI) Systems, vol. 15, No. 10, Oct. 2007, pp. 1091-1100, XP011192101.*
Persson, A., et al., "A Unified Analysis for Coded DS-CDMA With Equal-Gain Chip Combining in the Downlink of OFDM Systems," IEEE Transactions on Communications, vol. 53, No. 2, Feb. 2005, pp. 289-298, XP011127711.*
Yuan-Pei Lin; See-May Phoong; , "BER optimized channel independent precoder for OFDM system," Global Telecommunications Conference, 2002. GLOBECOM '02. IEEE , vol. 1, No., pp. 350-354 vol. 1, Nov. 17-21, 2002.*
Jongsun Kim; Verbauwhede, I.; Chang, M.-C.F.; , "Design of an Interconnect Architecture and Signaling Technology for Parallelism in Communication," Very Large Scale Integration (VLSI) Systems, IEEE Transactions on , vol. 15, No. 8, pp. 881-894, Aug. 2007.*
French Search Report for French Application No. 09/58498 dated Jul. 20, 2010.
Kim, J., et al., "Design of an Interconnect Architecture and Signaling Technology for Parallelism in Communication," IEEE Transactions on Very Large Scale Integration (VLSI) Systems, vol. 15, No. 8, Aug. 2007, pp. 881-894, XP011187729.

* cited by examiner

*Primary Examiner* — Abdullah Riyami
*Assistant Examiner* — Eric Myers
(74) *Attorney, Agent, or Firm* — Patent Portfolio Builders PLLC

(57) ABSTRACT

An integrated circuit and a method for transmitting messages from initiator units of an integrated circuit to at least one target unit of the integrated circuit. The initiator units transform first digital messages into second digital messages, the second messages being added, then transmitted to the target unit. The transformation of the first messages into second messages comprises the application of an orthogonal transformation by means of vectors obtained from rows or columns of an identity matrix.

15 Claims, 2 Drawing Sheets

DATA EXCHANGE DEVICE USING ORTHOGONAL VECTORS

This application claims priority to French patent application 09/58498, which was filed Nov. 30, 2009 and is incorporated herein by reference.

TECHNICAL FIELD

The present invention relates to a device and a method of data exchange between units of an integrated circuit, as for example occurs in microprocessors or memories.

BACKGROUND

Generally, the data exchange between units of an integrated circuit occurs between a number of initiator units and a target unit. The initiator units transmit digital messages that they code for their transmission to the target unit.

Prior art is described in Xin Wang et al.: "Applying CDMA Technique to Network-on-Chip", IEEE Transactions on very large scale integration (VLSI) systems, IEEE Service Center, Piscataway, N.J., USA, Vol. 15, #10, October 2007, pages 1091-1100. In this paper, the bits of the messages to be transmitted are coded by application of a set of orthogonal vectors derived from Walsh functions, then arithmetically added for transmission. The messages do not interfere and they are decoded at the target unit level.

SUMMARY OF THE INVENTION

An advantageous feature of embodiments of the present inventor is to decrease lag (number of clock cycles necessary for the initiator units to send a bit to a target unit). Some embodiments provide the advantageous features that they decrease the silicon surface area required by prior art circuits.

Thus, an embodiment of the present invention provides a method for transmitting messages from first units of an integrated circuit to at least one second unit of the integrated circuit, the first units transforming first digital messages into second digital messages, the second messages of the first units being added, then transmitted to said at least one second unit. The transformation of the first messages into second messages comprises the application of an orthogonal transformation by means of vectors obtained from rows or columns of an identity matrix.

According to an embodiment of the present invention, a bit of a first message of rank is transformed into an n-bit word of a second message of rank i by the steps of:

a) transforming said bit of the first message of rank i into an intermediary n-bit word by application of a vector obtained from a row or a column of an identity matrix of rank n;

b) obtaining the n-bit word of the second message of rank i by replacing the bit of rank i of said intermediary word with value "0".

According to an embodiment of the present invention, rank n of the identity matrix is equal to the number of first messages.

According to an embodiment of the present invention, for a bit $b_i$ of the first message of rank i, with i ranging from 1 to p, the second messages comprise n bits $b_{ij}$, with j ranging from 1 to n and indicating the position of bit $b_{ij}$ in the second message of rank i, each bit $b_{ij}$ being provided at a time $t_j$, and wherein, for each time $t_j$, sum $S_j$ of bits $b_{ij}$ is calculated according to expression $$S_j = \sum_{i=1}^{i=p} bij$$

and is provided to the second unit.

According to an embodiment of the present invention, sums $S_j$ are decoded in the second unit to recover bits $b_i$ of the first messages, the decoding of sums $S_j$ comprising the steps of:

a) if the first p sums $S_j$, with j ranging from 1 to n, corresponding to first messages transmitted at the same time are all equal to "0", defining that bits $b_i$ of the first messages are all equal to "0";

b) if the first p sums $S_j$ are all equal and are different from zero, defining that bits $b_i$ of the first messages are all equal to "1"; and c) if the first p sums $S_j$ do not all have the same value, defining that bit $b_i$ of the message of rank i is equal to "0" if sum $S_i$ is equal to the greater value of two values likely to be taken by the first p sums $S_j$ and defining that bit $b_i$ is equal to "1" if sum $S_i$ is equal to the minimum value of two values likely to be taken by the first p sums $S_j$.

According to an embodiment of the present invention, the transformation of the first messages into second messages comprises the implementation of an XOR operation between the bits of the first messages and the row or columns elements of the identity matrix.

According to an embodiment of the present invention, several vectors are assigned to a first unit and/or the assignment of one or several vectors to a first unit is modified along time.

According to an embodiment of the present invention, the first messages comprise several bits processed in parallel.

In another aspect, the present invention also provides for an integrated circuit comprising first units and at least one second unit connected to an interconnection unit. The first units are capable of providing second digital messages by a coding comprising the application of an orthogonal transformation to first messages, the orthogonal transformation being performed by means of vectors obtained from rows or columns of an identity matrix, the interconnection unit comprising at least one adder capable of adding the second messages of the first units and of transmitting second added messages to said at least one second unit.

According to an embodiment of the present invention, the circuit comprises means for transforming a bit of a first message of rank i into an n-bit word of a second message of rank i, a) said bit of the first message of rank i being transformed into an intermediary n-bit word by application of a vector obtained from a row or a column of an identity matrix of rank n;

b) the bit of rank i of said intermediary word being replaced with value "0" to obtain the n-bit word of the second message of rank i.

According to an embodiment of the present invention, dimension n of the identity matrix is greater than or equal to number p of the first messages.

According to an embodiment of the present invention, the second unit comprises a decoder, the decoder comprising:

a) means capable of determining whether the first p sums $S_j$, with j ranging from 1 to n, provided by the interconnection unit and corresponding to first messages transmitted at the same time, are all equal to zero;

b) means capable of determining whether the first p sums $S_j$ are all equal and are different from zero;

c) means capable of defining that bits $b_i$ of the first messages are all equal to "0" if the first p sums $S_j$ are all equal to "0";

d) means capable of defining that bits $b_i$ of the first messages are all equal to "1" if the first p sums $S_j$ are all equal and are different from zero; and, if the first p sums $S_j$ are not all of same value, e) means capable of defining that bit $b_i$ of the message of rank i is equal to "0" if sum $S_i$ is equal to the maximum value of two values likely to be taken by the first p sums $S_j$, and that bit $b_i$ of the message of rank i is equal to "1" if sum $S_i$ is equal to the minimum value of two values likely to be taken by the first p sums $S_j$.

According to an embodiment of the present invention, the means enabling to transform the first messages into second messages implement an XOR or $\overline{XOR}$ operation between the bits of the first messages and the row or column elements of an identity matrix.

According to an embodiment of the present invention, the circuit comprises a controller capable of modifying the assignment of the vectors to the first units along time and/or of assigning several vectors to a first unit.

According to an embodiment of the present invention, the first messages comprise several bits and the circuit comprises circuits capable of processing the bits of the first messages in parallel.

The foregoing objects, features, and advantages of embodiments of the present invention will be discussed in detail in the following non-limiting description of specific embodiments in connection with the accompanying drawings.

DETAILED DESCRIPTION OF ILLUSTRATIVE EMBODIMENTS

The present inventor has determined that the lag due to the use of orthogonal vectors originating from Walsh functions (which correspond to Hadamard matrixes) was due to two factors.

On the one hand, when these matrixes or functions are of order n, only n−1 vectors can be used since, due to the necessary digitization of the matrix, the first row is not linearly independent from the others and must be discarded. This results in a bandwidth loss, this loss being for example equal to 3% for n=32, or to 25% when n=4.

On the other hand, the dimension of the above matrixes can only be equal to an integral power of two. This results in an additional bandwidth loss which depends on the number of initiator units and may be very large. For example, if there are 16 initiator units, a matrix of order 32 must be used (due to the loss of a row, a matrix of order 16 only enables one to code 15 initiator units) and the bandwidth loss then is 50%, which is substantial.

In addition to minimizing, if possible at the same time, the two above-mentioned factors, embodiments of the present invention provide for a binary matrix having, on the one hand, all its lines linearly independent two by two and, on the other hand, a dimension that can better adapt to any number of initiator units. The identity matrix of order n which provides numerous advantageous features.

Figure 1:
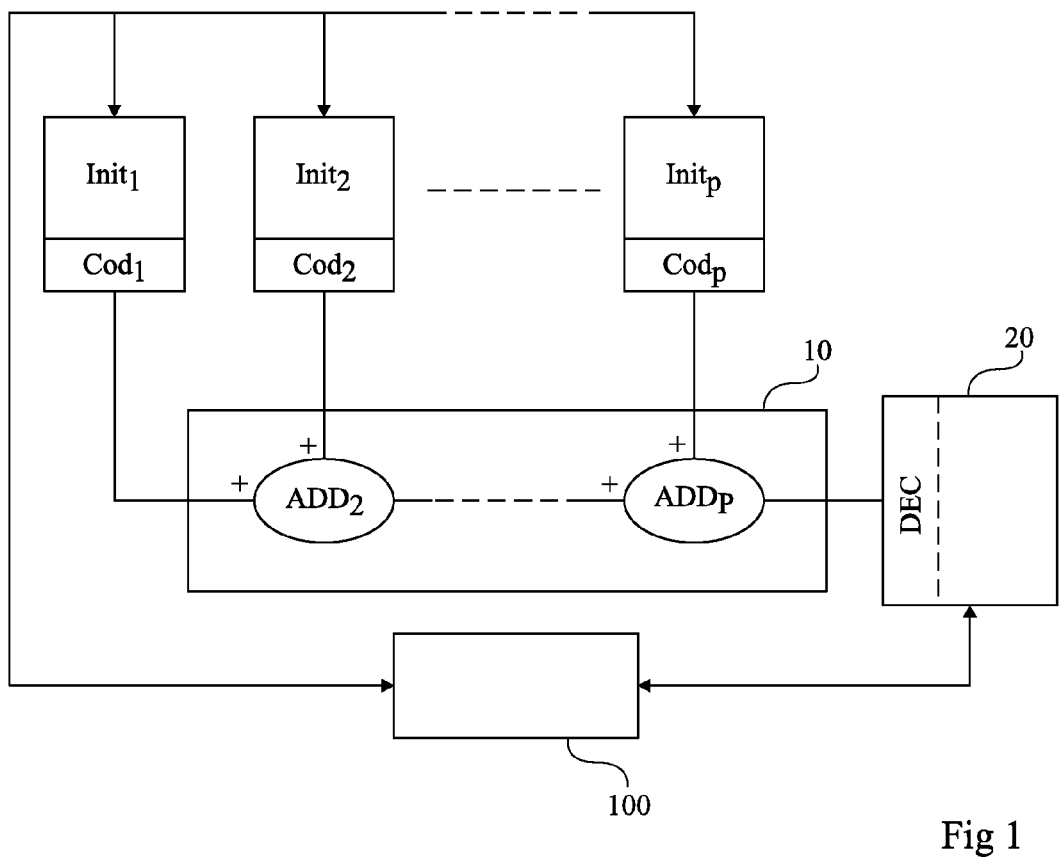
FIG. 1 shows a circuit for transmitting messages according to the present invention.

FIG. 1 shows a circuit 1 according to an embodiment of the present invention. Circuit 1 comprises a series of p initiator units, which, for simplification, will be called initiators hereafter, $Init_1$, $Init_2$, . . . . $Init_p$. Each initiator $Init_i$ is connected to a coder $Cod_i$, with i ranging from 1 to p. Each coder $Cod_i$ is assigned a vector derived from a row or a column of an identity matrix of order n greater than or equal to p. Each coder $Cod_i$ is connected to an interconnection unit 10, which is also connected to a target unit 20. A controller 100 is connected to initiators $Init_i$ and to target unit 20, especially to synchronize the system and to manage data exchanges.

Target unit 20 comprises a decoder DEC. Target unit 20 may correspond to one or several target circuits using the same decoder. Of course, interconnection unit 10 may also be connected to several target circuits, each having a decoder.

Interconnection unit 10 comprises half adders $ADD_2$, . . . $ADD_p$. Adder $ADD_2$ has an input connected to coder $Cod_1$ and an input connected to coder $Cod_2$. The output of adder $ADD_2$ is connected to an input of adder $ADD_3$, not shown, having its other input connected to the coder of rank 3. Generally, except for the first one, adder $ADD_i$ of rank i has its inputs connected to the coder of rank i and to the adder of rank i−1. The output of adder $ADD_i$ is connected to an input of the adder of rank i+1, except for the last one, of rank p, having its output connected to target unit 20.

A first operating mode of the circuit of FIG. 1 will now be detailed, assuming that the messages provided by the initiators only have one bit and that the dimension of the identity matrix is equal to number p of the initiators.

Initiator $Init_1$ thus provides a bit $b_1$ to coder $Cod_1$ and initiator $Init_i$, of rank i, with i ranging from 1 to p, provides a bit $b_i$ to coder $Cod_i$.

Coder $Cod_1$ transforms bit $b_1$ into a word $m_1$ of p bits $b_{11}$, $b_{12}$, . . . $b_{1p}$ by means of a vector derived from a row or a column of the identity matrix of order p. The same occurs for any coder $Cod_i$ which, from a bit $b_i$, provides a word $m_i$ of p bits $b_{ij}$, with j ranging from 1 to p. For example, coder $Cod_i$ performs an XOR logic operation between bit $b_i$ and each of the elements of the row of rank i of the matrix.

Each of bits $b_{ij}$ is provided to the output of coder $Cod_i$ at each clock cycle, that is, bits $b_{i1}$ are output from their respective coder at time $t_1$, bits $b_{ij}$ being provided at time $t_j$.

In interconnection unit 10, bits $b_{ij}$ are arithmetically added at each clock cycle, that is, at time $t_j$, the interconnection unit calculates sum $S_j$ of all bits $b_{ij}$ provided by coders $Cod_i$. Sum $S_j$ is provided to the decoder of target unit 20. Of course, sum $S_j$ is calculated by means of adders $ADD_2$, $ADD_p$, but it should be understood that any other architecture enabling calculation of sum $S_j$ is within the contemplated scope of the present invention.

The decoder of unit 20 thus receives, from time $t_1$ to time $t_p$, a set of p sums $S_j$. Sums $S_j$ are decoded to recover the transmitted messages, which is possible with no ambiguity since the vectors used in the coding are orthogonal. Once decoded, the transmitted messages are conveyed towards the corresponding target unit(s).

Among the advantages of the method according to described embodiments of the present invention described hereabove, it should be noted that the use of the identity matrix enables significant improvement to the system bandwidth.

By comparison, the binary matrixes based on Walsh functions are only pseudo-orthogonal and, hence, one of their rows cannot be used to code a message. On the contrary, the identity matrix directly is an orthogonal binary matrix, and all the vectors originating from its rows or columns may be used to code messages. The resulting bandwidth gain for example is 2% for a matrix of order 64.

On the other hand, the dimension of a matrix based on Walsh functions can only be equal to a power of 2. Thus, dimension 32 comes after dimension 16 and so, in the prior art, 32 clock pulses are necessary in all cases to transmit a number of messages ranging between 16 and 31. By contrast, the identity matrix may have any dimension, including an odd dimension, which can exactly adapt to the number of initiators. The bandwidth gain is here very large, since it may reach 50%.

Of course, the above-described operating mode may have several alterations without departing from the scope of the present invention.

For example, it should be understood that an initiator may be adapted to deliver several messages simultaneously, several rows of the identity matrix being assigned to the initiator.

The dimension of the identity matrix is not necessarily equal to the number of initiators or to the number of messages that can be transmitted at the same time. Generally, it is sufficient for the identity matrix to have a dimension greater than or equal to the maximum number of messages likely to be transmitted at the same time.

Also, when the messages provided by the initiators comprise several bits, the bits may be processed in parallel as described hereabove.

Further, the elements of the orthogonal vectors derived from the rows or columns of the identity matrix do not necessarily correspond to the elements of the identity matrix. For example, the elements of the used vectors may correspond to the inverses of the elements of the identity matrix, to a linear combination of rows (or columns) of the identity matrix, or to any other transformation which does not alter the orthogonality.

Also, an operator other than XOR may be used to obtain word $m_i$ from bit $b_i$. For example, the $\overline{XOR}$ function may be used, provided to accordingly modify the decoding algorithm.

A second embodiment of the circuit of FIG. 1 will now be described, wherein, as compared with the first mode, the words provided by the coders do not correspond to the direct application of a vector derived from the identity matrix.

First, as in the first mode, each coder $Cod_i$, with i ranging from 1 to p, applies a row or a column of the identity matrix of rank p to bit $b_i$ of the message of rank i to transform it into a p-bit word $m_i$. Word $m_i$ is formed of bits $b_{ij}$, with j ranging from 1 to p. Preferably, to obtain word $m_i$, coder $Cod_i$ performs an XOR logic operation between bit $b_i$ and each of the elements of a row of the identity matrix of dimension p. The used row or column of the identity matrix may be but is not necessarily of rank i.

The present inventor has then noted that if the bit of rank i of word $m_i$ is replaced with value "0", the possible values likely to be taken by the various sums $S_j$, with j ranging from 1 to p, are limited. Indeed, in this case, either all sums $S_j$ are equal, and they can then only have value "0" or value "p−1", or they are not all equal, and they can then only have one of two consecutive analog values N or N−1.

Thus, in the second embodiment of the circuit of FIG. 1, the p-bit word $m_i$ obtained by application of a row or column of the identity matrix to bit $b_i$ is an intermediary word which is modified into a p-bit word $M_i$. The modification comprises replacing the bit of rank i of word $m_i$ with value "0", word $M_i$ further corresponding to word $m_i$.

Words $M_i$ are provided to interconnection unit 10, where they are added to form sums $S_j$ transmitted to the decoder of target unit 20.

Figure 2:
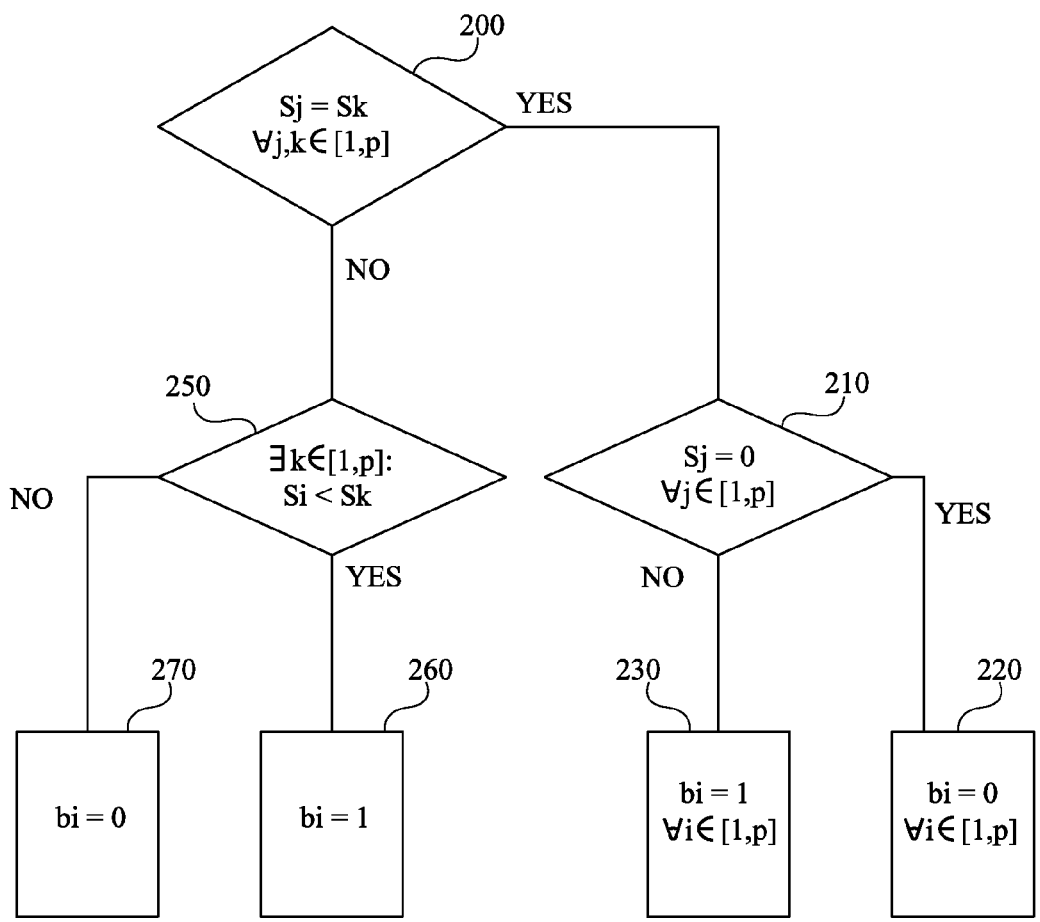
FIG. 2 illustrates the operation of a decoder according to the present invention.

Due to the forcing to "0" of the bits of rank i, the decoder is simplified, as will be seen hereafter in relation with FIG. 2.

FIG. 2 illustrates a decoding algorithm that can be used by the decoder of target unit 20. As seen previously, along times $t_1$ to $t_p$, the decoder receives a set p of sums $S_1, S_2 \ldots S_p$.

At step 200, the decoder examines whether all sums $S_j$, with j ranging from 1 to p, are identical.

If so, the decoder examines at step 210 whether sums $S_j$ are all zero.

If sums $S_j$ are all zero, this means that all the transmitted bits correspond to value "0", which is indicated in FIG. 2 at step 220.

If all sums $S_j$ are equal but are different from zero, this indicates that all the transmitted bits correspond to value "1" (step 230). As can be seen, although, in this case, the value of each of sums $S_j$ is known to be equal to p−1, the decoder need not determine this value to decode the transmitted messages. As a result, the decoder is simplified.

If at step 200, the answer is no, the method proceeds to step 250.

At step 250, the decoder determines in any fashion whether a sum of rank i, $S_i$, is equal to N or to N−1. If sum $S_i$ is equal to N, bit $b_i$ has value "0". If sum $S_i$ is equal to N−1, bit $b_i$ has value "1". Here again, the value of N, which ranges between 1 and p−1, matters little and the decoder need not know it or determine it to define bits $b_i$.

Thus, in FIG. 2, based on any sum $S_i$, the decoder determines at step 250 whether there exists a sum $S_k$, with k ranging from 1 to p, which is greater than sum $S_i$. If such is the case, sum $S_i$ corresponds to value N−1 and bit $b_i$ is equal to "1" (step 260); otherwise, bit $b_i$ is equal to "0" (step 270). The transmitted messages are thus decoded after examination of all sums, without requiring the determination of the values of the sums.

Accordingly, the second operating mode of the circuit of FIG. 1 enables greatly simplifying the decoder, which may be formed by simple comparators, which results in a significant gain in silicon surface area efficiency.

Further, less data are required by the decoder, since they come down to four states for sums $S_j$. As a result, the bus which connects interconnection unit 10 to target unit 20 may have a decreased number of rows, which further decreases the used silicon surface area.

Of course, as in the case of the first embodiment, the second operating mode may be modified without departing from the scope of the present invention.

Thus, an initiator may provide several simultaneous messages. In this case, several rows or columns of the identity matrix are assigned to this initiator and the coder associated with this initiator is capable of delivering the coded words corresponding to these messages.

Additionally, when the messages provided by the initiators comprise several bits, the bits may be processed in parallel, each bit being processed as described hereabove.

Also, the dimension of the identity matrix may be greater than the number of transmitted messages. For example, assume that the identity matrix is of dimension n and the number of messages is equal to a number p smaller than n. As previously described, bit $b_i$ of the message of rank i is coded by application of a row or of a column, for example, the row of rank i, of the matrix, after which the bit of rank i of the obtained word is forced to "0" before transmission to interconnection unit 10. In this case, at the decoding, only the first p sums $S_j$ are to be considered, the sums of rank p+1 to n being useless to recover the value of the transmitted bits.

However, preferably, the rank of the matrix is adapted to the number of transmitted messages, to decrease the system lag. This may be provided for at the level of controller 100 which, in its management of the system, can adapt the matrix dimension to the number of transmitted messages.

It should be noted that the method according to the present invention is very flexible and is able to adapt to various situations.

For example, if an initiator wants to send several messages simultaneously, the controller can assign as many vectors thereto as there are messages to be sent. These vectors may be borrowed from other initiators which do not hold the priority. They can also be created by increasing the size of the matrix.

Also, the controller can modify the assignment of the vector(s) assigned to an initiator over time.

Generally, it should be noted that, in the described embodiments of the present invention, interconnection unit 10 comprises no conditional logic elements, which simplifies the device. Further, any electronic device comprising a circuit according to the present invention or implementing a method according to the present invention of course is within the scope of the present invention.

Specific embodiments of the present invention have been described hereabove, as well as different variations. It should be noted that those skilled in the art may combine various elements of these various embodiments and/or variations without showing any inventive step.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for transmitting messages from first units of an integrated circuit to at least one second unit of the integrated circuit, the method comprising:
    transforming first digital messages by the first units into second digital messages;
    adding the second messages of the units; and
    transmitting said added second messages to said at least one second unit, wherein
        the transformation of the first messages into second messages comprises applying an orthogonal transformation by means of vectors obtained from rows or columns of an identity matrix, and wherein
        a bit (bi) of a first message of rank i is transformed into an n-bit word (Mi) of a second message of rank i by the steps of:
            a) transforming said bit of the first message of rank i into an intermediary n-bit word (mi) by application of a vector obtained from a row or a column of an identity matrix of rank n; and
            b) obtaining the n-bit word of the second message of rank i by replacing the bit of rank i of said intermediary word with value "0".

2. The method of claim 1, wherein rank n of the identity matrix is equal to the number of first messages.

3. The method of claim 1, wherein for a bit bi of the first message of rank i, with i ranging from 1 to p, the second messages comprise n bits bij, with j ranging from 1 to n and indicating the position of bit bij in the second message of rank i, each bit bij being provided at a time tj, and wherein, for each time tj, a sum Sj of bits bij is calculated according to an expression $$Sj = \sum_{i=1}^{i=p} bij$$

and is provided to the second unit.

4. The method of claim 3, wherein sums Sj are decoded in the second unit to recover bits bi of the first messages, the decoding of sums Sj comprising the steps of:
    a) if the first p sums Sj, with j ranging from 1 to n, corresponding to first messages transmitted at the same time are all equal to "0", concluding that bits bi of the first messages are all equal to "0";
    b) if the first p sums Sj are all equal and are different from zero, concluding that bits bi of the first messages are all equal to "1"; and
    c) if the first p sums Sj do not all have the same value, defining that bit bi of the message of rank i is equal to "0" if sum Si is equal to the greater value of two values likely to be taken by the first p sums Sj and concluding that bit bi is equal to "1" if sum Si is equal to the minimum value of two values likely to be taken by the first p sums Sj.

5. The method of claim 1, wherein the transformation of the first messages into second messages comprises the implementation of an XOR operation between the bits of the first messages and the row or columns elements of the identity matrix.

6. The method of claim 1, wherein several vectors are assigned to a first unit.

7. The method of claim 6 wherein the assignment of at least one vector to a first unit is modified over time.

8. The method of claim 1, wherein the first messages comprise several bits processed in parallel.

9. An integrated circuit comprising:
    an interconnection unit; and
    first units and at least one second unit connected to the interconnection unit, wherein
        the first units are configured to provide second digital messages by a coding comprising the application of an orthogonal transformation to first messages, the orthogonal transformation being performed by means of vectors obtained from rows or columns of an identity matrix, and wherein
        the interconnection unit comprises at least one adder configured to add the second messages of the first units and to transmit said added second messages to said at least one second unit; and wherein the integrated circuit further comprises:
    means for transforming a bit of a first message of rank i into an n-bit word of a second message of rank i, wherein
        a) said bit of the first message of rank i is transformed into an intermediary n-bit word by application of a vector obtained from a row or a column of an identity matrix of rank n; and
        b) the bit of rank i of said intermediary word is replaced with value "0" to obtain the n-bit word of the second message of rank i.

10. The circuit of claim 9, wherein dimension n of the identity matrix is greater than or equal to number p of the first messages.

11. The circuit of claim 9, wherein the second unit comprises a decoder, the decoder comprising:
   a) means for determining whether the first p sums Sj, with j ranging from 1 to n, provided by the interconnection unit and corresponding to first messages transmitted at the same time, are all equal to zero;
   b) means for determining whether the first p sums Sj are all equal and are different from zero;
   c) means for defining that bits bi of the first messages are all equal to "0" if the first p sums Sj are all equal to "0";
   d) means for defining that bits bi of the first messages are all equal to "1" if the first p sums Sj are all equal and are different from zero; and, if the first p sums Sj are not all of same value,
   e) means for defining that bit bi of the message of rank i is equal to "0" if sum Si is equal to the maximum value of two values likely to be taken by the first p sums Sj, and that bit bi of the message of rank i is equal to "1" if sum Si is equal to the minimum value of two values likely to be taken by the first p sums Sj.

12. The circuit of claim 9, wherein the first units implement an XOR or $\overline{XOR}$ operation between bits of the first messages and row or column elements of the identity matrix.

13. The circuit of claim 9, comprising a controller configured to modify the assignment of the vectors to the first units over time.

14. The circuit of claim 13 wherein the controller is further configured to assign more than one vectors to a first unit.

15. The circuit of claim 9, wherein the first messages comprise several bits and wherein the circuit comprises circuits capable of processing the bits of the first messages in parallel.

* * * * *